April 27, 1926. 1,582,496
O. A. WELLS
METHOD AND APPARATUS FOR ANNEALING AND COOLING SHEET GLASS
Filed Oct. 17, 1924 2 Sheets-Sheet 1
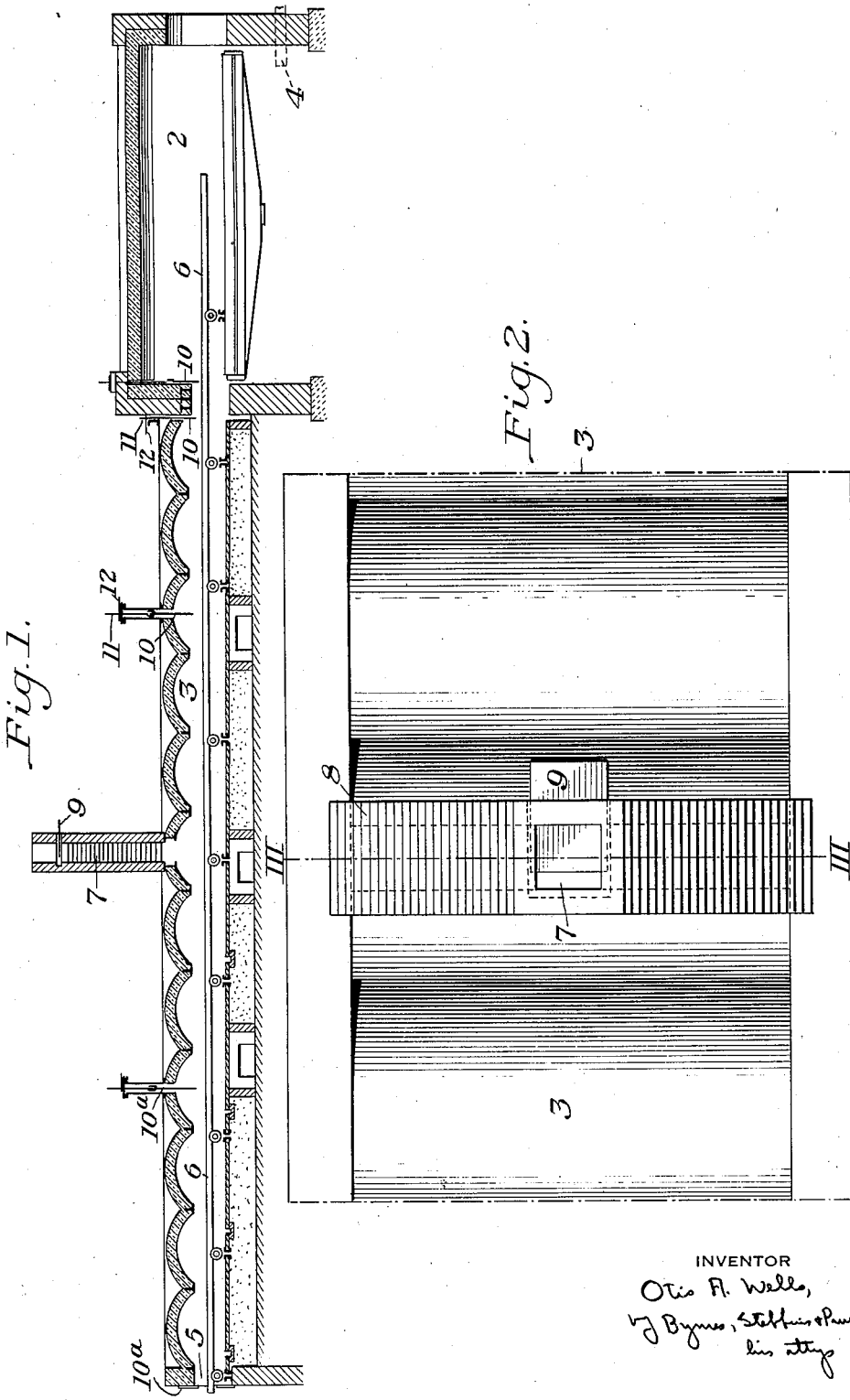

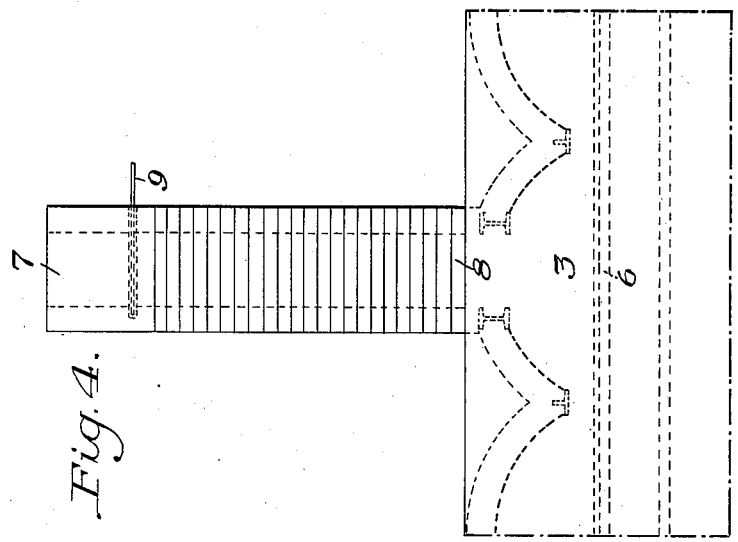
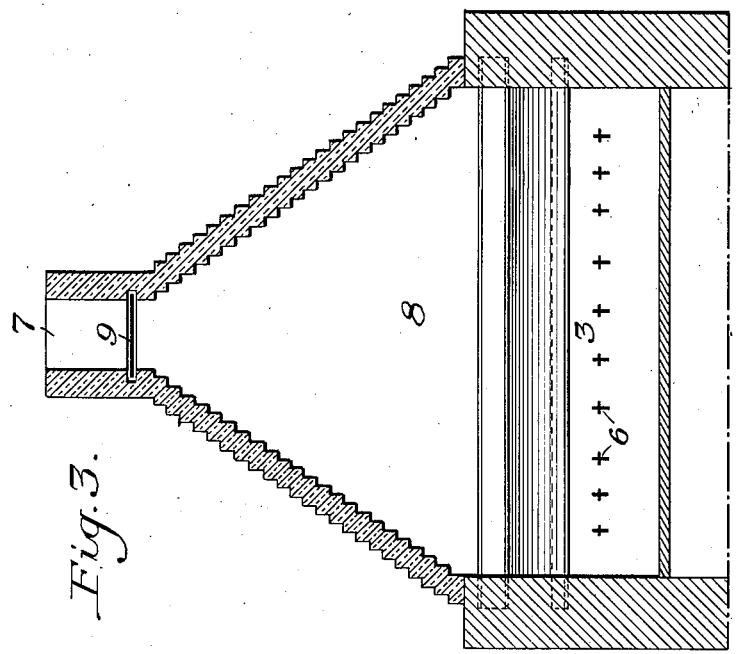

Patented Apr. 27, 1926.

1,582,496

UNITED STATES PATENT OFFICE.

OTIS A. WELLS, OF ARNOLD, PENNSYLVANIA, ASSIGNOR TO WINDOW GLASS MACHINE COMPANY, OF ARNOLD, PENNSYLVANIA, A CORPORATION OF NEW JERSEY.

METHOD AND APPARATUS FOR ANNEALING AND COOLING SHEET GLASS.

Application filed October 17, 1924. Serial No. 744,164.

*To all whom it may concern:*

Be it known that I, OTIS A. WELLS, a citizen of the United States, residing at Arnold, county of Westmoreland, State of Pennsylvania, have invented a new and useful Method and Apparatus for Annealing and Cooling Sheet Glass, of which the following is a full, clear, and exact description.

The invention relates to a method and apparatus for annealing and cooling sheet glass and is particularly useful in connection with apparatus having as a source of heat a chamber wherein a previous operation is performed upon the sheet glass, such as a flattening oven or a sheet drawing apparatus, although the invention is not in any way limited thereto.

In the annealing and cooling of sheet glass, it has been found that, if a leer tunnel of uniform cross section is used and all of the gases supplied to one end thereof are permitted to travel uninterruptedly the entire length of the tunnel, the gas stream above the glass will soon be much hotter than the stream below and as a result the lower face cools more rapidly, so that the glass is warped when it is delivered from the leer. If it is desired to produce sheet glass, such as window glass, which is substantially flat, it is necessary to equalize the rate of heat loss from the two faces of the glass sheet. Various methods of accomplishing this object have been proposed, as for example, that shown in the copending application of John Hartzell, Serial No. 693,249, filed February 16, 1924.

In that application there is shown a leer tunnel having means for diverting hot gases from the upper stream and thus achieving the desired flatness of product. In actual use of the Hartzell invention, however, it has been found that while it is effective for the production of flat glass it requires an unusually long leer tunnel if the product is to be delivered at such temperature that it will not crack or check when it is exposed to room temperature upon delivery. When the invention is applied to leers of ordinary length, it is found that the temperature of the glass sheets at delivery is higher than the desired temperature, especially if glass shawls are being flattened at a high rate of speed.

I provide for bathing both surfaces of the glass sheet with hot gaseous streams as the glass is cooled through the annealing range, and for thereafter, but before removing the glass from the leer, subjecting the same to a substantially cooler temperature condition than would result if such gaseous streams were permitted to travel uninterruptedly through the leer tunnel as disclosed in the above mentioned Hartzell application.

I preferably provide a stack or stacks on the leer tunnel at a point beyond where annealing occurs, adapted for the removal of a substantial portion of the gases flowing through the leer tunnel. A damper, or other means for regulating the stack action, is preferably provided so that regulation of the amount of gases withdrawn may be had. Preferably this damper is so set as to maintain a substantially quiescent atmosphere in the leer tunnel beyond the stack. In connection with my invention, I preferably provide dampers in the leer tunnel, as disclosed in the above mentioned Hartzell application, so that the gaseous streams above and below the glass may be relatively controlled, thus insuring the desired flatness of product.

In the accompanying drawings illustrating the present preferred embodiment of my invention as applied to the cylinder process of making sheet glass—

Figure 1 is a vertical, longitudinal section through a flattening oven and connected leer tunnel embodying my invention;

Figure 2 is a top plan view to enlarged scale of a portion of the apparatus shown in Figure 1;

Figure 3 is a vertical section on the line III—III of Figure 2 and

Figure 4 is a side elevation of the apparatus shown in Figure 2.

In the illustrated embodiment of my invention, there is shown a flattening oven 2 having a horizontally extending leer tunnel 3 connected therewith. The oven 2 is heated in any desired manner, as by a gas burner 4, and the heat from the oven passes along the leer tunnel toward the delivery end 5. Leer rods 6 of any suitable construction are placed in the leer tunnel 3 for supporting the glass as it travels therethrough. When the leer is in operation these rods are effective for supporting the glass sheets in such a manner as to form a partial partition through the leer tunnel so that hot gases from the flattening oven are divided into two streams, one above and one below the glass sheets.

It will be understood that the term "flattening oven," as used herein, refers to the oven as a whole and is intended to include not only that portion of the apparatus where the glass is actually flattened, but also the so-called dummy oven, cooling oven and piling oven, as will be well understood by those skilled in this art.

As the glass sheets are advanced through the leer tunnel 3, both surfaces of the sheets are bathed with hot gases from the flattening oven 2. As is well-known, these gases decrease in temperature as they pass through the leer and their purpose is to retard the cooling of the glass to such an extent as to prevent the setting up of undesired internal stresses in the glass sheets. The effect of the leer tunnel upon the glass sheets may be stated to be; first, a cooling through the annealing range during which the glass sheets assume their final form; and second, a cooling from below the annealing point to a desired delivery temperature. During this latter operation no permanent warping or deformation of the glass can occur, but it is nevertheless necessary in order to prevent shattering or checking of the sheets when they are subjected to room temperature.

I provide a stack 7 for withdrawing a substantial portion of the hot gases from the leer at a point beyond where the glass has passed through the annealing range. This stack preferably is flared out at the bottom portion, as indicated at 8 so as to withdraw gasses over substantially the entire width of the leer tunnel. A damper 9 is provided for regulating the amount of heat which is taken off by the stack. This damper is preferably so regulated that a substantially quiescent atmosphere obtains in the leer tunnel between the stack 7 and the delivery opening 5. With this arrangement, the glass is bathed in heated gases as it passes through the annealing range and the product may, therefore, be effectively controlled. The quiescent atmosphere beyond the stack 7 provides a region of more rapidly decreasing temperature than could be readily provided if the heated gases were permitted to travel through the leer tunnel from one to end and it has been found in actual operation that with my invention it is possible to deliver the glass at materially reduced temperatures.

In order to secure the desired flatness of product, I provide one or more dampers 10 between the flattening oven and the stack. As shown in Fig. 1 these dampers are provided with upwardly extending supports 11, which are perforated to accommodate pins 12, whereby the vertical position of the dampers may be adjusted in order to equalize the cooling effect of the upper and lower streams. If desired, one or more dampers 10ª may be provided beyond the stack 7, but it is found in practice that these exert only a minor regulating effect, especially where the damper 9 is so adjusted as to provide a quiescent atmosphere beyond the stack 7.

I thus provide a method and apparatus for annealing and cooling sheet glass wherein the glass sheets are bathed on both sides with streams of hot gases over the annealing range of the glass and are thereafter subjected to a temperature substantially lower than the temperature to which they would be subjected if the hot gases were permitted to take their usual course through the leer and were not otherwise acted on. I further provide for so regulating these gaseous streams as to substantially equalize the cooling effect from both surfaces of the glass sheet during the annealing period. My invention is highly advantageous in that the glass is delivered in a flat and unwarped condition at a low temperature and may be readily handled and subjected to a dipping operation or the like without fear of its cracking or checking.

While I have illustrated a preferred form of my invention as applied to the cylinder process of making window glass, it will be understood that the invention is not thus limited but may be otherwise embodied within the scope of the following claims.

I claim:

1. In the method of annealing and cooling sheet glass, the steps consisting in supplying flat hot glass to a horizontally extending leer, passing hot gases through the leer in streams above and below the glass and withdrawing gases over substantially the entire width of the leer intermediate the ends of the leer.

2. Apparatus for annealing and cooling sheet glass, including a horizontally extending leer tunnel, means for passing sheet glass therethrough, means for introducing gaseous streams above and below the glass, and means intermediate the ends of the leer for withdrawing gases over substantially the entire width of the leer.

3. In the method of annealing and cooling sheet glass, the steps consisting in supplying flat hot glass to a horizontally extending leer, the glass being supported so as to leave gas spaces above and below the same, supplying hot gases to the leer and permitting the same to travel along the leer tunnel in streams above and below the glass, confining substantially all of the gases in the tunnel until the glass has reached its annealing point, and then withdrawing a substantial portion of the gases over the entire width of the leer.

4. In the method of annealing and cooling sheet glass, the steps consisting in supplying flat hot glass to a horizontally extending leer, supporting the glass within the leer so as to leave a gas space above and below the glass, supplying hot gases to the leer and permitting the same to pass through the leer in streams above and below the glass, regulating the cooling effect of one stream relative to the other, confining substantially all of the gases supplied to the leer within the same until the glass has reached its annealing point, and then withdrawing a substantial portion of the gases, the gases beng withdrawn over substantially the entire width of the leer.

5. Apparatus for annealing and cooling sheet glass, including a horizontally extending leer tunnel, means for passing glass therethrough, means for introducing gaseous streams above and below the glass, the tunnel being substantially gas-tight over the range thereof in which the glass is annealed, and means intermediate the ends of the leer but beyond the annealing range for withdrawing gases over substantially the entire width of the leer.

In testimony whereof I have hereunto set my hand.

OTIS A. WELLS.